(12) United States Patent
Blyler et al.

(10) Patent No.: US 6,289,158 B1
(45) Date of Patent: Sep. 11, 2001

(54) COATED OPTICAL FIBER WITH ENHANCED DELAMINATION RESISTANCE AND THERMALLY ENHANCED STRIPPABILITY

(75) Inventors: Lee L. Blyler, Basking Ridge, NJ (US); Arturo Hale, New York, NY (US); Valerie Jeanne Kuck, Upper Montclair, NJ (US); Xina Shu-Wen Quan, Bridgewater, NJ (US); Mark Anthony Paczkowski, Andover, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/551,024

(22) Filed: Apr. 17, 2000

Related U.S. Application Data

(60) Provisional application No. 60/166,283, filed on Nov. 18, 1999.

(51) Int. Cl.[7] .................. G02B 6/02; B05D 5/06; C03B 37/023
(52) U.S. Cl. .................. 385/128; 385/123; 385/127; 385/141; 385/114; 427/163.2; 65/385
(58) Field of Search .................. 385/123, 126, 385/127, 128, 141, 144, 114; 427/163.2, 165; 65/385, 432

(56) References Cited

U.S. PATENT DOCUMENTS

| | | | | |
|---|---|---|---|---|
| 5,181,268 | * | 1/1993 | Chien | 385/128 |
| 5,373,577 | * | 12/1994 | Shackleton et al. | 385/128 |
| 5,373,578 | * | 12/1994 | Parker et al. | 385/128 |
| 5,408,564 | * | 4/1995 | Mills | 385/128 |
| 5,444,808 | * | 8/1995 | Shackleton et al. | 385/128 |
| 5,639,846 | * | 6/1997 | Shustack | 528/44 |

* cited by examiner

*Primary Examiner*—Brian Healy
(74) *Attorney, Agent, or Firm*—Lowenstein Sandler PC

(57) ABSTRACT

In accordance with the invention, an optical fiber is provided with a protective polymer coating that is substantially free (less than 0.1% by weight and preferably 0%) of adhesion promoters and coupling agents. Advantageously, in lieu of adhesion promoters, the primary polymer coating formulation is provided with an additive which will covalently bond with the fiber but not with the primary polymer.

14 Claims, 4 Drawing Sheets

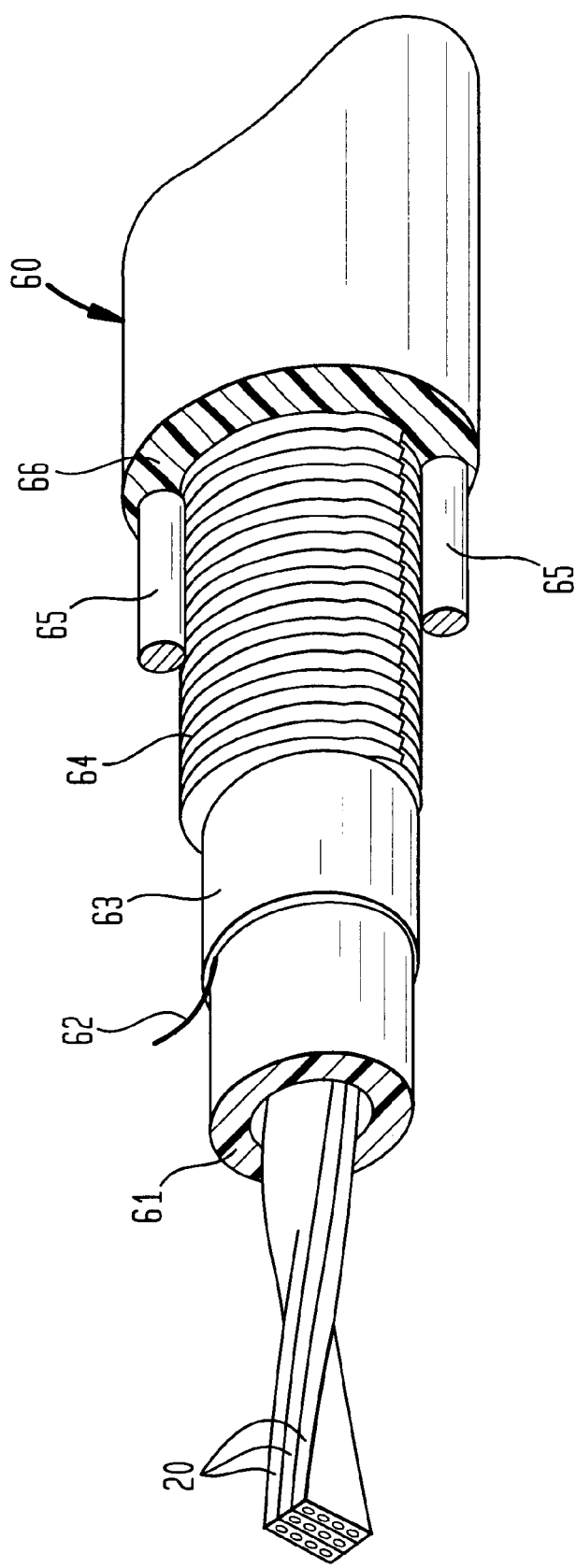

COATED OPTICAL FIBER WITH ENHANCED DELAMINATION RESISTANCE AND THERMALLY ENHANCED STRIPPABILITY

CROSS REFERENCE TO RELATED APPLICATIONS

This application claims the benefit of U.S. Provisional Application No. 60/166,283, now abandoned, filed by L. Blyler et al. on Nov. 18, 1999 and entitled "Coated Optical Fiber With Enhanced Delamination Resistance And Thermally Enhanced Strippability", which is incorporated herein by reference.

TECHNICAL FIELD

This invention relates generally to protective coatings for optical fiber, and more particularly to coatings which omit adhesion promoters but nonetheless provide enhanced delamination resistance at typical ambient temperatures and reduced delamination resistance at elevated temperatures typically used in field stripping.

BACKGROUND OF THE INVENTION

In the manufacture of optical fiber, a glass preform rod is suspended vertically and moved into a furnace at a controlled rate. The preform softens in the furnace and a glass fiber (also referred to as an optical fiber) is drawn freely from the molten end of the preform rod by a capstan located at the base of a draw tower. Because the surface of the glass fiber is susceptible to damage caused by abrasion, it is necessary to coat the fiber immediately after it is drawn but before it comes into contact with any surface. Inasmuch as the application of a coating material must not damage the glass surface, the coating material is applied in a liquid state. Once applied, the coating material must solidify before the glass fiber reaches the capstan. This is typically accomplished within a brief time interval by photocuring—a process in which the liquid coating material is converted to a solid upon exposure to electromagnetic radiation, preferably ultraviolet (UV) light.

Because the fibers are thin and flexible, they are readily bent when subjected to mechanical stresses such as those encountered during handling or exposure to varying temperature environments. Such bends in the fiber frequently result in optical loss that is much greater than the intrinsic loss of the fiber itself, and it has been found desirable to protect the glass fiber against such bending. Accordingly, the coating material is required to cushion the glass fiber against bends and two layers of coating materials are typically applied to the drawn optical fiber. An inner (primary) coating, having a relatively low in situ equilibrium modulus, is applied directly to the glass fiber. The in situ modulus of the primary coating is the equilibrium modulus of the coating measured on the fiber. An outer (secondary) coating, having a relatively high modulus, surrounds the primary coating. Together, these coatings protect the inherently high tensile strength of the glass fiber as long as the primary coating remains bonded to the glass.

It is desirable that optical fiber coatings show high delamination resistance at ambient temperatures. The separation of the primary, inner coating from the silica fiber during fiber manufacturing and subsequent handling can result in the formation of a "delamination" area which can adversely affect the optical performance of the fiber. A delaminated area is characterized by a gap at the interface of the fiber and the primary coating. The gap alters the mechanical properties at the point of delamination and may cause fiber transmission losses. Even if the optical performance is substantially not affected, the delamination can result in negative customer perception and is therefore unacceptable.

Delamination resistance at a given temperature is typically determined by supporting the coated fiber under tension on a support member and driving a cylindrical steel member with a known load against the fiber. After impact, the fiber is observed for delamination, and the test is repeated at another position on the fiber. The load for which 50% of the impacted areas delaminate is referred to as the delamination resistance ("DR50") of the coated fiber. Further details concerning the measurement of delamination resistance are set forth in U.S. Pat. No. 5,908,484 issued to R. L. Decker et al. on Jun. 1, 1999 and entitled "Method of Making A Coated Optical Fiber Comprising Measuring The Delamination Resistance of the Coating", which is incorporated herein by reference.

In what appears to be a requirement contradictory to delamination resistance, it is also desirable to be able to easily strip the primary coating from the glass fiber at elevated temperatures—particularly when a number of fibers are bonded together in an array such as shown in U.S. Pat. No. 4,900,126. Such an array is frequently referred to as a "ribbon." Indeed, if the coating materials cannot be cleanly and easily stripped, then splicing and interconnecting operations will be seriously hampered.

It is commonly believed that adhesion promoters form an adhesive bond between the primary coating and the silica fiber that minimizes the tendency to delaminate at ambient temperatures. Examples of commonly used adhesion promoters are: [3-(methacryloyloxy)propyl] trimethoxysilane, g-mercaptopropyltrimethoxysilane, aminopropyl trimethoxysilane, vinyl trimethoxysilane, and allyl trimeythoxysilane, [3-(acryloyloxy)propyl] trimethoxysilane. We believe that all commercially available optical fibers are coated with primary coatings containing adhesion promoters. Typical formulations include adhesion promoters at a loading level of 0.5–3.0 wt. %.

SUMMARY OF THE INVENTION

This invention is predicated upon applicants' discovery that, in reality, adhesion promoters (coupling agents) can reduce the delamination resistance of protective polymer coatings at typical ambient temperatures. Such promoters, chosen to provide covalent bonds with both the fiber and the primary polymer, also increase delamination resistance at typical elevated temperatures used in field stripping.

In accordance with the invention, an optical fiber is provided with a protective primary polymer coating that is substantially free (less than 0.1% by weight and preferably 0%) of adhesion promoters and coupling agents. Advantageously, in lieu of adhesion promoters, the primary polymer coating formulation is provided with an additive which will covalently bond with the fiber but not with the primary polymer.

BRIEF DESCRIPTION OF THE DRAWINGS

The invention and its mode of operation will be more clearly understood from the following detailed description when read with the appended drawing in which:

FIG. 5 discloses a cable having a number of optical fiber ribbons.

DETAILED DESCRIPTION

Figure 1:
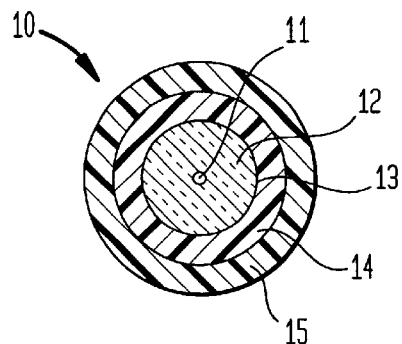
FIG. 1 is an end view, in cross section, of an optical fiber that includes a coating system in accordance with the present invention.

This description is divided into three parts: Part I describes the experimental results leading to the invention; Part II describes typical fiber products to which the invention is applied; and Part III describes specific examples of coated fibers in accordance with the invention.

I. The Experimental Basis for the Invention

Applicants have investigated the mechanics of fiber stripping using a delaminator similar to the aforementioned Decker et al. patent. The delaminator presses a weighted 6 mm diameter steel rod against a coated fiber, and the operator observes through a microscope the formation of voids between the glass fiber and the primary coating in response to the applied force. The applied weight at which void formation is seen in half the samples is the delamination resistance ("DR50") of the coated fiber. The Decker et al. apparatus was modified by adding a heater and a video camera so that applicants could observe real-time delamination mechanics at elevated temperature. The modified delaminator is described in greater detail in U.S. patent application Ser. No. 09/342,611, filed by Alosio et al. on Jun. 29, 1999, entitled, "Coated Optical Fiber With Increased Modulus And Thermally Enhanced Strippability".

Using this apparatus, we have carried out extensive experimentation with dual coated fibers either containing or lacking adhesion promoters. We found that the delamination performance correlated with the presence or absence of adhesion promoters. Surprisingly, the absence of adhesion promoter consistently yielded coatings with a higher resistance to delamination at ambient.

The temperature dependence of the resistance to delamination is also an important consideration. At the elevated temperatures used in stripping >100 C, it is desirable that the coating can be readily and cleanly removed from the silica. We have found that the coatings lacking in adhesion promoter evidenced a lower delamination resistance at the elevated temperatures than the fiber coatings with adhesion promoter. This was particularly true for primary coatings having an in situ modulus >120 psi where extraordinary low forces were required to induce delamination.

It is thought that the incorporation of adhesion promoters in the primary coating also serves to protect the silica fiber from corrosion and prevents the collection of water at the coating-silica interface. We suggest substituting the adhesion promoter with an alkoxysilane having a non-reactive pendant group in the uncured primary coating formulation. The substituted alkoxysilane can be provided in a similar proportion, e.g. 0.5–3 wt. %. These silanes will form a passivation layer on the silica without forming covalent bonds with the primary coating. Such materials would include alkyltrialkoxysilanes, where the alkyl group can be for example a linear, branched or cyclic moiety having one to twenty carbons and the alkoxy group can be for example a methyl or ethyl group. Other suggested materials can be halogen substituted alkyltrialkoxysilanes such as perfluoro alkyltrialkoxysilanes. These silane materials can be used in the monomeric or siloxane oligomeric form. They can be applied to the silica prior to application of the primary and secondary coatings, added to the primary formulation or added to the secondary formulation. In the latter case the silane material will slowly diffuse through the primary coating to the silica. Other metal organalkoxides such as titanates could also protect the silica while not being coupled to the primary coating.

II. Typical Fiber Structures to which the Invention Applies

FIG. 1 shows an end view, in cross section, of a coated optical fiber 10 comprising a glass fiber 12 surrounded by a protective coating system comprising layers 14, 15. It is well known to draw glassy optical fiber from a specially prepared, cylindrical preform which has been locally and symmetrically heated to a temperature of about 2000° C. As the preform is fed into and through a furnace, glass fiber 12 is drawn from the molten material. A protective coating system is applied to the glass fiber 12 after it has been drawn from the preform that preferably comprises two layers of radiation-cured polymeric materials. An inner layer 14 contacts the glass fiber 12 at a glass-coating interface 3 and is referred to as a primary coating material. An outer layer 15, which is referred to as a secondary coating material, surrounds the inner layer. One method of applying dual layers of coating materials to a moving glass fiber is disclosed in U.S. Pat. No. 4,474,830 which issued on Oct. 2, 1984 to C. R. Taylor. Another method for applying dual layers of coating materials onto glass fiber is disclosed in U.S. Pat. No. 4,851,165, which issued on Jul. 25, 1989 to J. A. Rennell and C. R. Taylor. By way of illustration, the typical diameter of glass fiber 12 is about 125 micrometers, while the diameter of its core 11 is generally less than 10 micrometers for single mode fibers. (Core 11 is the region where light is substantially confined during its propagation along the glass fiber's longitudinal axis by the refractive index profile of the glass fiber.) And finally, each layer of coating material has a thickness of about 30 micrometers so that the overall diameter of coated fiber 10 is approximately 250 micrometers.

Coating Materials

Coating materials not only protect the glass fiber from abrasion and cushion it against microbending loss, but they also help preserve its tensile strength. However, in order to preserve tensile strength, the primary coating material must stay bonded to the glass—at least until it is stripped off, and then it is desirable that it be fully removable without leaving a residue on the glass. More specifically, the interface between the primary coating material and the glass fiber must be characterized by suitable strength to prevent delamination and must be such that the coating system can be easily stripped from the optical fiber without tenacious residues being left on the fiber surface. On the other hand, the surface of the secondary coating material must be such that tacking does not occur between adjacent convolutions of the fiber, resulting in a jerky payoff from a process spool.

Coating materials typically comprise a primary polymeric material, such as urethane-acrylate, whose molecules become crosslinked when exposed to ultraviolet light. Various additives are also present that enhance one or more properties of the coating. For example, photoinitiators are added to accelerate the curing process which is important because coated optical fiber is wrapped around spools for storage as soon as it is cured, and manufacturing speed is critical to profitability. Curing is the conversion of the liquid coating material into a solid. In the present system this process is known as free-radical cure wherein, upon absorption of light, the photoinitiator components cleave to form free radical pairs, which diffuse away from each other and react with acrylate-terminated components to initiate a chain polymerization process. In addition to photoinitiators, coating materials further include diluents, antioxidants, and, in some cases, additives to improve strippability. In accordance with the invention, they should not include adhesion promoters.

Figure 2:
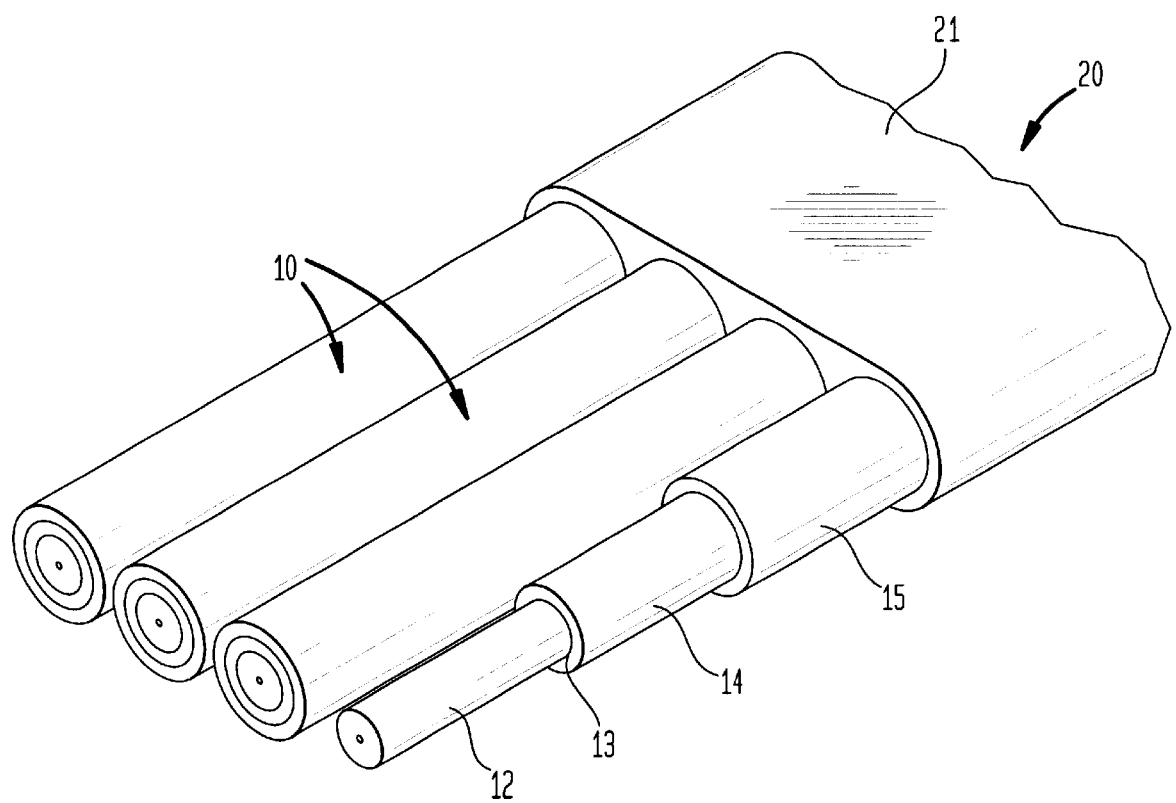
FIG. 2 is a perspective view of an optical fiber ribbon showing a group of coated glass fibers bonded together with a matrix material.

Referring now to FIG. 2, there is shown a perspective view of an optical fiber ribbon 20 showing a group of coated glass fibers 10—10 that are held together with an ultraviolet (UV)-curable matrix bonding material 21. The group of optical fibers are disposed in a coplanar parallel array, and while only four fibers are shown, such arrays typically comprise eight or more individual fibers. The equilibrium modulus of the matrix material has a value less than that of the outer coating layer of the fiber but greater than the equilibrium modulus of the inner coating layer. The matrix material 21 fills the interstices, bonds together the optical fibers, and extends to the outside boundary of the ribbon. Known UV-curable matrix materials 21 comprise a resin, a diluent and a photoinitiator. More detailed information regarding bonded arrays of optical fibers is available in the aforementioned U.S. Pat. No. 4,900,126.

Ribbon Stripping

Figure 3A:
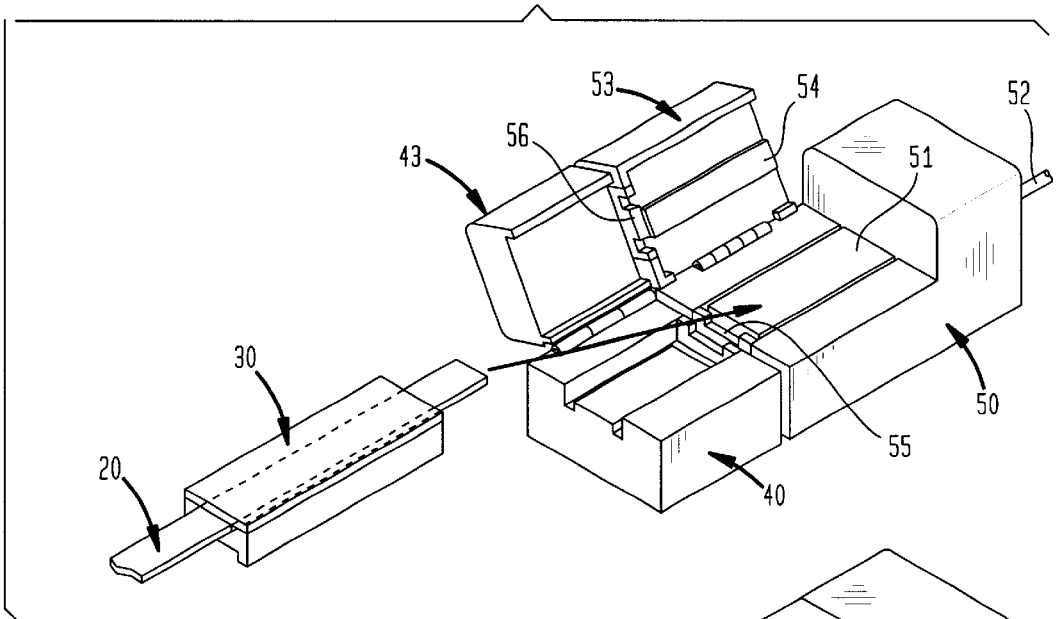
FIGS. 3A–3C illustrate the use of a ribbon-stripping tool showing three progressive stages in the removal of matrix and coating materials from a group of glass fibers.
Figure 3B:
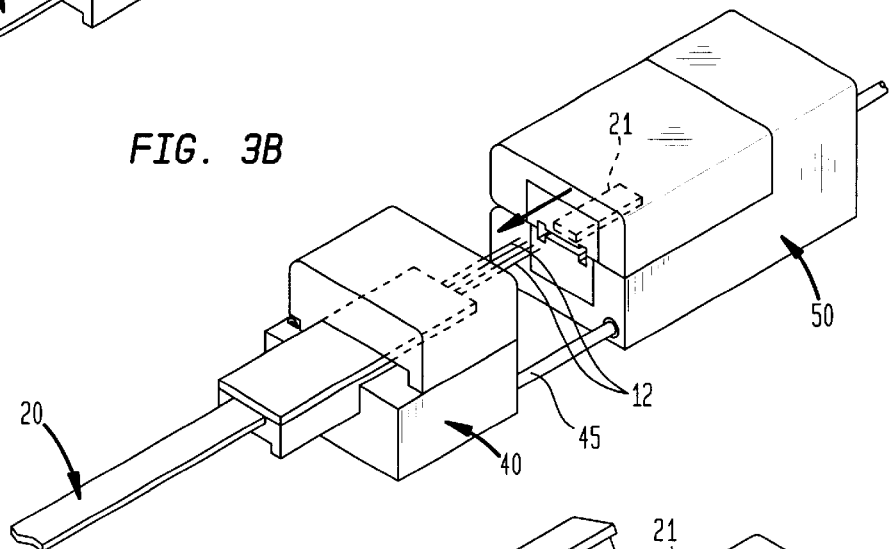
Figure 3C:
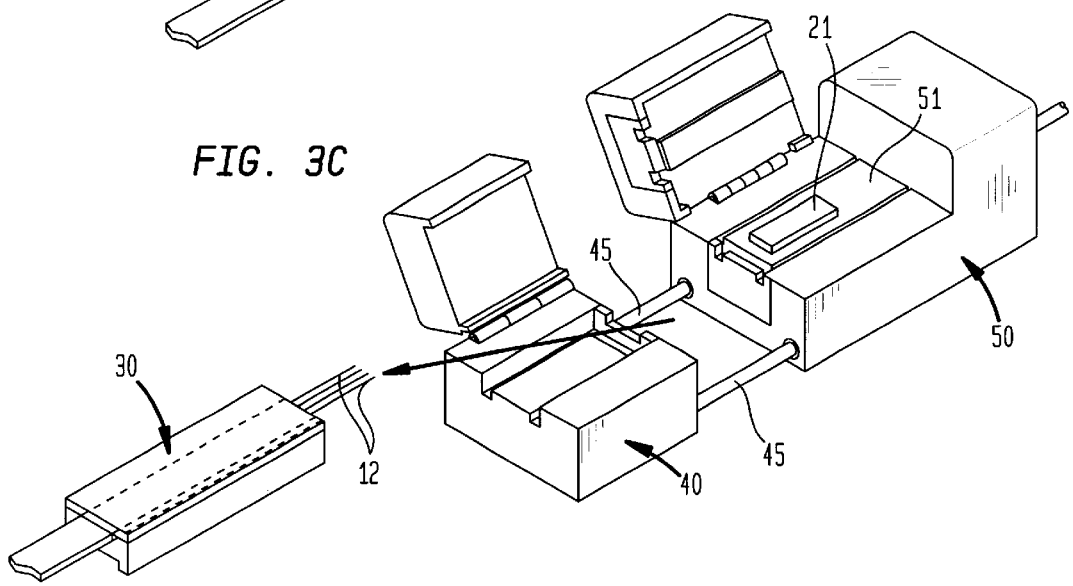

Reference is made to FIGS. 3A–3C, which illustrates use of a ribbon-stripping tool such as used by splicing technicians for mass fusion splicing. FIG. 3A shows the principal elements of the ribbon stripping tool and associated apparatus. Ribbon 20 is placed within fiber holder 30 to facilitate handling of the fiber during the stripping process. The stripping tool comprises a holder grip 40 and a main body 50 that are used for removing the various layers that surround a bonded fiber array. Lid 53 is closed during the stripping operation and includes an inner surface 54 which cooperates with a heated platen 51 to frictionally hold the outside jacket material surrounding the glass fibers within ribbon 20.

Referring first to FIG. 3A, fiber holder 30 is shown in its closed position around ribbon 20 which is about to be inserted into the ribbon-stripping tool. The portion of ribbon 20 which is to have its coating layers removed extends beyond the forward end of the fiber holder so that it can be captured between platen 51 and the inside surface 54 of lid 53 when the lid is closed onto the main body 50. Upon closure, opposing blades 55, 56 are positioned to cut partially into opposite sides of ribbon 20 so that a well-defined break in the coating material can be made. The particular tool used is electrically heated from an AC power source, which is converted to 12 volts DC for use by a heater element within the main body 50. Holder grip 40 is adapted to capture fiber holder 30 therein when its lid 43 is closed.

FIG. 3B illustrates the movement of holder grip 40 away from the main body 50 of the ribbon-stripping tool. Guide rails 45—45 allow the holder grip to slide into engagement with the main body in a controlled manner. A heater (not shown) within the main body raises the temperature of platen 51 to a predetermined level which weakens/breaks the adhesive bond at the interface 13 between primary coating 14 and glass fiber 12 (see FIG. 1 or 2) of the various coated fibers. Illustratively, a temperature of 100–200° C. for about 10 seconds provides acceptable results. Once the bond is weakened/broken the rest of the operation involves sliding the primary coating along the glass fiber surface. The ability of the primary coating to slide will depend on it sliding friction with the glass fiber. This action will determine how easily the composite (matrix 21 and coatings 14, 15) can be removed and the amount of residue that remains on the bare glass fibers.

Figure 4A:
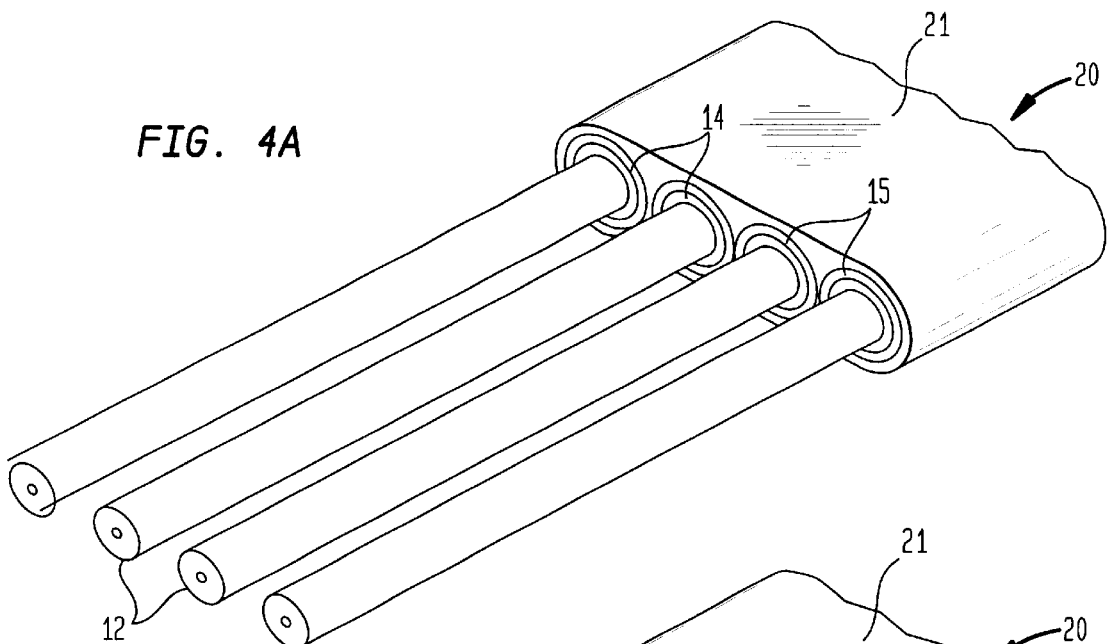
FIGS. 4A–4C illustrate various outcomes of the ribbon-stripping procedure.
Figure 4B:
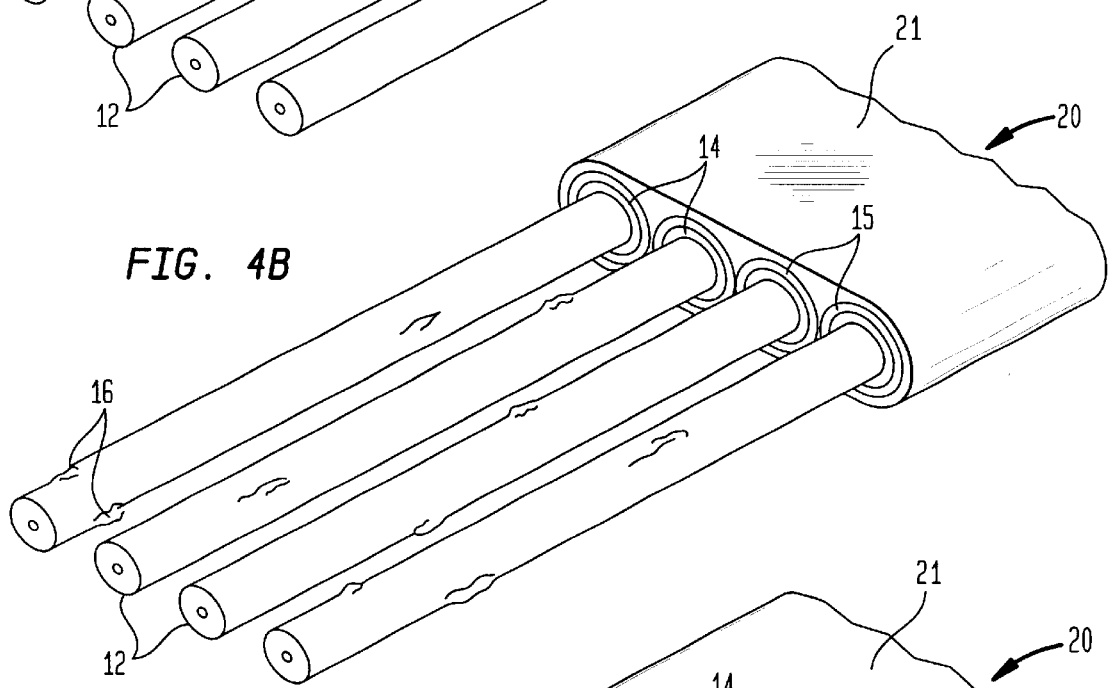
Figure 4C:
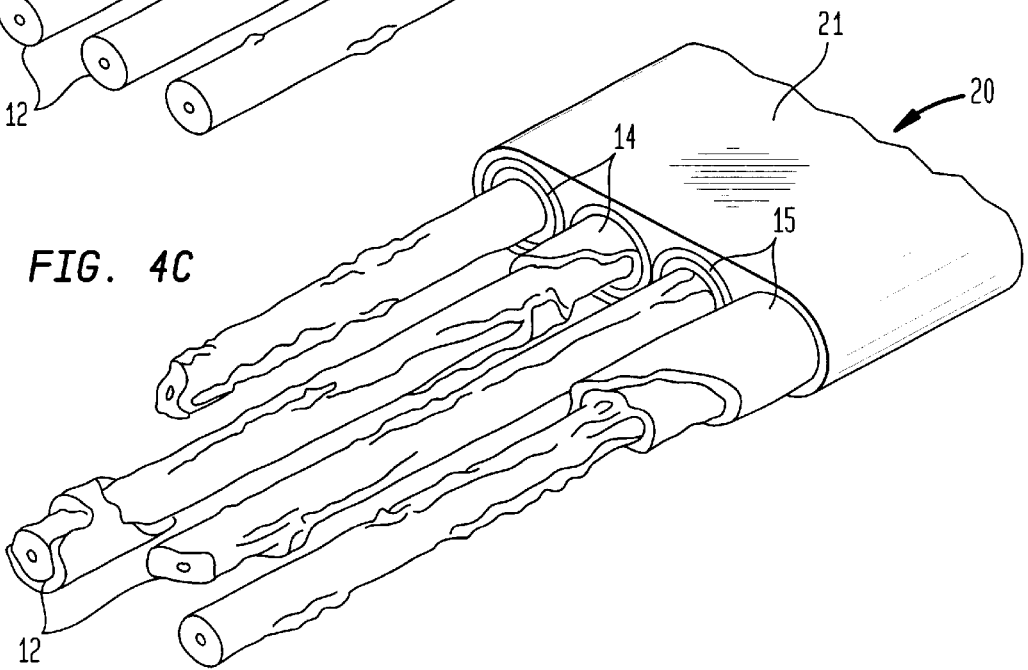

Finally, FIG. 3C shows end results of the ribbon stripping process in which glass fibers 12—12 protrude from ribbon 20 which is still held within the fiber holder 30. And matrix material 21, which has just been stripped away, remains on the heated platen 51 of the main body 50. Having stripped the matrix and coating materials away from the glass fibers 12—12, FIGS. 4A–4C are used for illustrating the various possible results of the stripping process and for discussing their acceptability. For example, FIG. 4A shows an ideal condition wherein the matrix 21 and coating materials 14, 15 are fully removed from the glass fibers 12—12. Such results are frequently possible with the present invention although the presence of some residues 16—16, as shown in FIG. 4B, is less desirable but acceptable provided they can be removed by gentle wiping with an alcohol-moistened cotton swab. However, FIG. 4C illustrates an unacceptable condition in which the coating materials have clung to the glass fibers so tenaciously that either breakage occurs or large patches remain that cannot be easily removed.

Bonded arrays of optical fibers, as discussed above, are commercially available. Each ribbon comprises twelve fibers, and as many as twelve ribbons are stacked together for high density. The ribbon stack is surrounded by a core tube that may also contain a filler that prevents the incursion of water in outside plant applications. FIG. 5 provides greater detail regarding the construction of a practical cable according to the present invention. Optical cable 60 includes ribbons 20 as discussed above. These ribbons are disposed within a tubular member 61, which is made from a dielectric material such as polyvinyl chloride or polyethylene, for example. Surrounding tubular member 61 is a water-absorbing tape 63, a corrugated metallic shield 64, and plastic jacket 66. A ripcord 62 made of Kevlar® plastic, facilitates sheath removal, and jacket 66 of polyethylene material, for example, encloses strength members 65-65. Strength members are used to eliminate or reduce stresses that might otherwise be applied to the optical fibers during handling or normal service, and may be included within the cable 60 in any number of known ways. Typically, a filling material is disposed within the tubular member 61 that serves to cushion the fibers contained therein, thereby protecting against microbending loss. Greater detail regarding the construction of cable 60 and suitable filling materials are disclosed in U.S. Pat. No. 4,844,575, which is hereby incorporated by reference.

III. Illustrative Embodiments

In illustrative embodiments of the invention the primary coating is free of adhesion promoters or coupling agents but nonetheless exhibits enhanced delamination resistance at typical ambient temperatures and enhanced strippability at typical elevated temperatures used in field stripping.

EXAMPLES

Example 1

80 parts-by-weight of ARU-339 (a difunctional urethane acrylate oligomer, which is commercially available from the Echo Resins company);

20 parts-by-weight of 2-(2-ethoxyethoxy)ethyl acrylate (a monofunctional monomer, which is commercially available from the Sartomer company as SR-256); and 2 parts-by-weight of Irgacure 1700 (a photoinitiator, which is commercially available from the Ciba company.

The equilibrium modulus of this formulation, after curing with ultraviolet (UV) radiation with a dose of about 1 J/cm$^2$, was 5.5 Mpa.

Example 2

80 parts-by-weight of ARU-339 (a difunctional urethane acrylate oligomer, which is commercially available from the Echo Resins company;

15 parts-by-weight of 2-(2-ethoxyethoxy) ethyl acrylate (a monofunctional monomer, which is commercially available from the Sartomer company as SR-256);

5 parts-by-weight of isooctyl mercaptopropionate (a chain transfer agent, which is commercially available from the Hampshire Chemical Corp.); and 2 parts-by-weight of Irgacure 1700 (a photoinitiator, which is commercially available from the Ciba Corp.)

The equilibrium modulus of this formulation, after curing with ultraviolet (UV) radiation with a dose of about 1 J/cm$^2$, was 2.4 Mpa.

Example 3

40 parts-by-weight of ARU-339 (a difunctional urethane-acrylate oligomer, which is commercially available from the Echo Resins Corp.);

53 parts-by-weight of ethoxylated nonyl-phenol acrylate (a monofunctional monomer, which is commercially available from the Sartomer Corp. as SR-504);

5 parts-by-weight of laurel acrylate (a monofunctional monomer, which is commercially available from the Sartomer Corp. as SR-335);

2 parts-by-weight of isooctyl mercaptopropionate (a chain transfer agent, which is commercially available from the Hampshire Chemical Corp.); and 2 parts-by-weight of Irgacure 1700 (a photoinitiator, which is commercially available from the Ciba Corp.)

The equilibrium modulus of this formulation, after curing with ultraviolet (UV) radiation with a dose of about 1 J/cm$^2$, was 0.4 Mpa.

Example 4

40 parts-by-weight of ARU-339 (a difunctional urethane-acrylate oligomer, which is commercially available from the Echo Resins Corp.);

53 parts-by-weight of ethoxylated nonyl-phenol acrylate (a monofunctional monomer, which is commercially available from the Sartomer Corp. as SR-504);

5 parts-by-weight of hexanediol diacrylate (a difunctional monomer, which is commercially available from the Sartomer Corp. as SR-238);

2 parts-by-weight isooctyl mercaptopropionate (a chain transfer agent, which is commercially available from the Hampshire Chemical Corp.); and 2 parts-by-weight of Irgacure 1700 (a photoinitiator, which is commercially available from the Ciba Corp.

The equilibrium modulus of this formulation, after curing with ultraviolet light (UV) radiation with a dose of about 1 J/cm$^2$, was 1.3 Mpa.

It is to be understood that the above-described embodiments are illustrative of only a few of the many possible specific embodiments which can represent applications of the principles of the invention. Numerous and varied other arrangements can be readily devised by those skilled in the art without departing from the spirit and scope of the invention.

What is claimed is:

1. An optical fiber coated with a radiation-cured primary coating, the optical fiber comprising an elongated strand of glass that is adapted to guide light waves along the length, the primary coating comprising a primary polymeric material and a photoinitiator

CHARACTERIZED IN THAT the primary coating is substantially free of adhesion promoters or coupling agents to enhance delamination resistance and thermally enhanced strippability, the proportion of adhesion promoters and coupling agents in the primary coating less than 0.1 weight %.

2. The optical fiber of claim 1 wherein the proportion of adhesion promoters and coupling agents is 0 wt %.

3. The optical fiber of claim 1 wherein the primary coating material comprises an oligomer based on a polyether backbone that is end-capped with acrylate groups via urethane linkages.

4. The optical fiber of claim 1 further including a secondary layer of coating material that surrounds the primary layer of coating material, the secondary layer having a substantially higher equilibrium modulus than the primary coating material.

5. The optical fiber of claim 1 wherein a plurality of said fibers are disposed in a longitudinal array with longitudinal axes thereof being substantially parallel to one another, said fiber being surrounded by a matrix bonding material that fills interstices between adjacent optical fibers and extends to a periphery that envelops the array.

6. The bonded array of claim 5 wherein said bonded array is substantially flat.

7. The optical fiber of claim 1 wherein a plurality of the fibers are disposed in a core tube that extends along a longitudinal axis of a cable, the cable including: (i) a plastic jacket that encloses the core tube, and (ii) strength members having tensile stiffness for receiving loads applied to the cable.

8. The optical fiber of claim 7 wherein said fibers are positioned in a longitudinal array with longitudinal axes thereof being substantially parallel to one another, said fibers being surrounded by a matrix bonding material that fills interstices between adjacent optical fibers and extends to a periphery that envelops the array.

9. The optical fiber of claim 1 wherein the primary coating further comprises an additive which will covalently bond with the fiber but not with the primary polymer.

10. The optical fiber of claim 9 wherein the additive comprises an alkoxysillane having a non-reactive pendant group.

11. An optical fiber coated with a radiation-cured primary coating, the optical fiber comprising an elongated strand of glass that is adapted to guide light waves along its length, the primary coating substantially free of adhesion promoters and coupling agents and comprising an additive which covalently bonds with the fiber but not with the primary polymer.

12. The fiber of claim 11 wherein the additive comprises an alkoxysilane having a non-reactive pendant group.

13. The fiber of claim 12 wherein the alkoxysilane comprises 0.5–3 weight % of the primary coating.

14. The fiber of claim 12 wherein the alkoxysilane comprises an alkyltrialkoxy silane.

* * * * *